July 5, 1932.  W. KLEMPERER  1,865,698
HYDROSTATIC LOAD FACTOR INDICATOR FOR AIRCRAFT
Original Filed Aug. 29, 1921
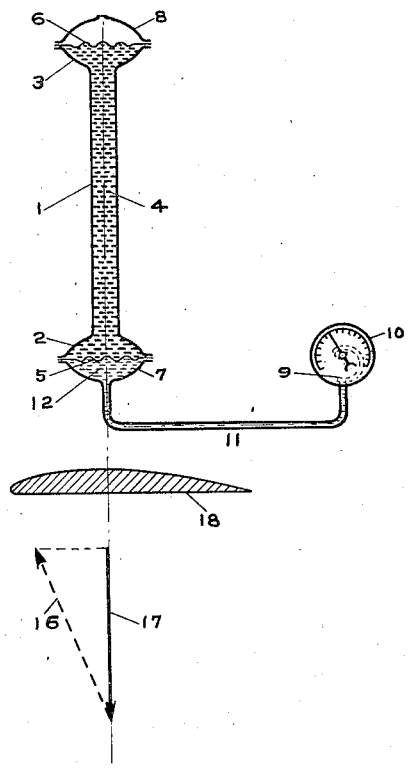
Inventor
Wolfgang Klemperer Patented July 5, 1932

1,865,698

UNITED STATES PATENT OFFICE

WOLFGANG KLEMPERER, OF AKRON, OHIO, ASSIGNOR TO THE FIRM OF CARL ZEISS, OF JENA, GERMANY

HYDROSTATIC LOAD FACTOR INDICATOR FOR AIRCRAFT

Original application filed August 29, 1921, Serial No. 496,732, and in Germany August 14, 1919. Divided and this application filed March 28, 1929. Serial No. 350,722.

This application is a division of my application, Serial No. 496,732 filed Aug. 29, 1921.

The structural strength of airplane wings is usually stated in terms of multiples of the service weight of the craft. In straight level flight this multiple or strength factor is identical with the factor of safety. In other phases of flight, however, especially in violent maneuvers such as occur in air combat, in exhibition or stunt flying or in heavy weather, higher stresses are thrown into the wing structure than in straight level flight. The ratio of the free force which is the vectorial sum of weight and inertia, to the weight alone is referred to as the actual occurring load factor. This is a quantity of considerable interest to the pilot because its margin against the strength factor is the actual margin of structural safety in that particular moment. This actual occurring load factor is what is indicated by the instrument according to my invention.

The instrument is based upon the principle of the similitude of the equilibrium of suspension, weight and inertia forces between a small mass resiliently carried aboard the airplane and the corresponding equilibrium of forces acting upon the airplane itself. According to the present invention the mass system of the instrument is a column of liquid housed in a tube and confined by flexible or slack diaphragms. The pressure difference between the two ends of the liquid column is transmitted to a mechanical manometer, preferably of the diaphragm type. This manometer or pressure gauge is suitable graduated in load factor units. The pressure difference produced at the two ends of the liquid column is proportional not to the whole resultant " free force " or vectorial sum of weight and inertia, but only to its component projection upon the axis of the column. When the danger component normal to the chord plane of the wings is of primary importance, the instrument is mounted aboard the airplane with the axis of the liquid column at right angles to the plane of the wings, at or near the center of gravity or the center of lift of the wings.

The invention may be more fully described by having reference to the accompanying figure. The tubular container 1 and the adjoining shallow vessels 2 and 3 are filled with a relatively heavy liquid or fluid 4 confined by the two slack diaphragms 5 and 6 which are made of a soft, yielding or filmy material. Other shallow vessels 7 and 8 encase the diaphragms. The resilient sensitive element 9 of a mechanical manometer 10 is connected to the vessel 7 by a tube 11 filled with a fluid 12 of considerably lesser density than the fluid 4 confined between the two diaphragms. The rear side (case chamber) of the manometer and the vessel (8) adjoining the other end of the heavy liquid column are either left open to the atmosphere, or made to communicate to the same pressure or closed.

The heavy liquid 4 may for instance be mercury, while alcohol may serve as the lighter transmitting fluid 12. If water or glycerine or other liquids of low freezing points are used as the sensitive column 4, air or other gases are used as transmitter fluid 12.

It will be seen that the apparent weight of the heavy liquid column is transmitted thru the slack diaphragm 5 and the fluid pressure is transmitted thru the connection 11 to the indicator.

When the airplane on which the instrument is installed is tilted the manometer pointer will recede. Whenever the airplane is subjected to an acceleration, for instance in the direction of the dotted arrow 16 the inertia component in direction of the column axis (solid arrow 17) will make itself known as an increased bottom pressure as though the specific weight of the liquid column had increased. The manometer will accordingly respond with an increased deflection, over that which would have corresponded to the angle of pitch which the vehicle happened to have assumed at that particular instant. The liquid column 1 being mounted essentially at right angles to the wing 18 of the airplane, the instrument registers the beam load factor of the wing.

By suitable selection of the length and inside diameter of the tubes carrying the heavy fluid as well as the transmitter fluid, an economical amount of damping can be obtained, rendering the instrument free from oscillations but yet not too sluggish.

I do not wish to limit my invention to the particularities of the example shown, since many minor variations will be obvious to those skilled in the art. For instance the column containing the heavy liquid may be mounted at quite some distance apart from the indicating gauge or the instrument may be installed in other directions for instance upside down, in which case the manometer would operate under suction rather than pressure, but essentially in the same manner.

I claim:

1. A load factor indicator for aircraft comprising a tube containing a liquid column, a vessel at each end thereof, a slack diaphragm housed in each of said vessels and confining said liquid column, a mechanical manometer, a tube connecting said mechanical manometer with one of the vessels, said tube having a fluid therein of considerably lighter density than said liquid column.

2. A load factor indicator for aircraft comprising a tube containing a liquid column, a shallow, bulb-like vessel at each end thereof, a slack diaphragm housed in each of said shallow, bulb-like vessels and confining said liquid column, a mechanical manometer, a tube connecting said mechanical manometer with one of the shallow, bulb-like vessels, said tube having a fluid therein of considerably lighter density than said liquid column.

3. A load factor indicator for aircraft comprising a tube having a shallow, bulb-like vessel at each end, a slack diaphragm encased in each of said vessels, a comparatively heavy liquid contained in the space between said two slack diaphragms, a mechanical manometer, a connection between the sensitive element of said manometer and the chamber formed between one of the said diaphragms and the part of the bulb-like vessel opposite to the heavy liquid, said connection containing a relatively lighter fluid.

4. A load factor indicator for aircraft comprising a tube having a shallow, bulb-like vessel at each end, a slack diaphragm encased in each of said vessels, a liquid contained in the spaces between said two slack diaphragms, a mechanical manometer and a gas-filled connection between the sensitive element of said manometer and the chamber formed between one of the said diaphragms and the part of the bulb-like vessel opposite to the heavy liquid.

5. A load factor indicator for airplanes comprising a tube, disposed essentially at right angles to the wings of the airplane, said tube having a shallow, bulb-like vessel at each end, a slack diaphragm encased in each of said vessels, a comparatively heavy liquid contained in the space between said two slack diaphragms, a mechanical manometer, a connection between the sensitive element of said manometer and the chamber formed between one of the said diaphragms and the part of the bulb-like vessel opposite to the heavy liquid, said connection containing a relatively lighter fluid.

6. A load factor indicator for aircraft comprising a tube having a shallow, bulb-like vessel at each end, a slack diaphragm encased in each of said vessels, a liquid contained in the spaces between said two slack diaphragms, a mechanical manometer, and a gas-filled connection between the sensitive element of said manometer and the chamber formed between one of the said diaphragms and the part of the bulb-like vessel opposite to the heavy liquid.

7. A load factor indicator for aircraft comprising a tube having a shallow, bulb-like vessel at each end, a slack diaphragm encased in each of said vessels, a liquid contained in the space between said two slack diaphragms, a mechanical manometer, a connection between the sensitive element of said manometer and the chamber formed between one of the diaphragms and the part of the bulk-like vessel opposite to the aforementioned liquid, the reverse side of the casing of said manometer and the reverse side of the other slack diaphragm being open to or communicating with the same atmosphere.

Signed at Akron, in the county of Summit and State of Ohio, U. S. A., this 26th day of March, 1929.

WOLFGANG KLEMPERER.

CERTIFICATE OF CORRECTION.

Patent No. 1,865,698.  July 5, 1932.

WOLFGANG KLEMPERER.

It is hereby certified that the above numbered patent was erroneously issued to "the firm of Carl Zeiss, of Jena, Germany," as assignee of the entire interest in said inventon whereas said patent should have been issued to the inventor said Klemperer as sole owner of said invention; and that the said Letters Patent should be read with this correction therein that the same may conform to the record of the case in the Patent Office.

Signed and sealed this 25th day of October, A. D. 1932.

(Seal)

M. J. Moore,
Acting Commissioner of Patents.